Figure 1:
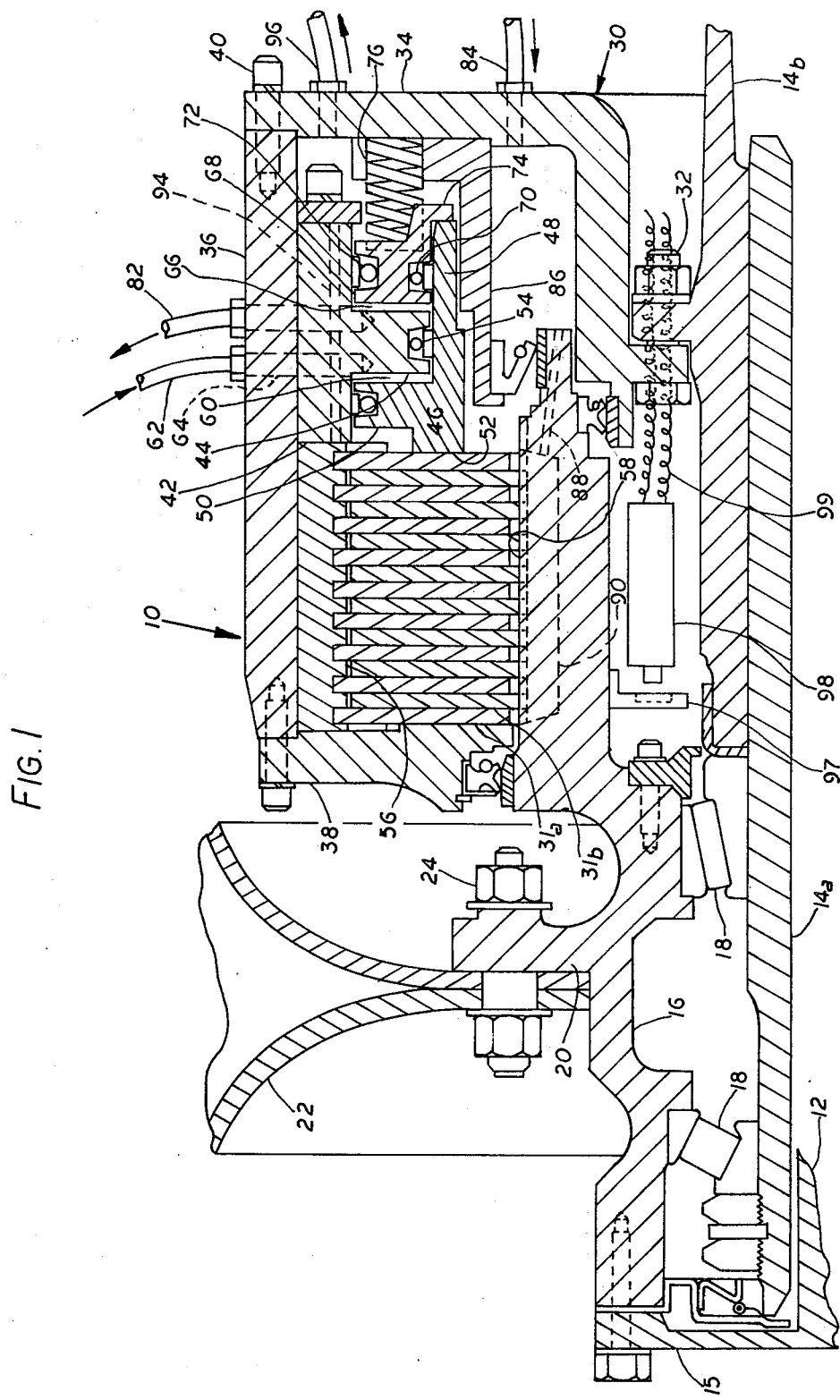

United States Patent [19]
Houser

[11] 3,946,837
[45] Mar. 30, 1976

[54] DISC BRAKE AND ACTUATOR ASSEMBLY

[75] Inventor: Raymond E. Houser, Wooster, Ohio

[73] Assignee: Rohr Industries, Inc., Chula Vista, Calif.

[22] Filed: Dec. 26, 1974

[21] Appl. No.: 536,427

[52] U.S. Cl. ...................... 188/72.4; 92/62; 92/63; 92/108; 188/72.6; 188/106 F; 188/170; 188/271; 188/290; 188/366; 192/83; 192/91 A
[51] Int. Cl.² ........................................ F16D 65/32
[58] Field of Search ....... 188/170, 366, 106 F, 72.1, 188/72.4, 72.6, 290, 71.5, 221; 192/83, 86, 91 A; 92/62, 63, 107, 108, 109; 303/6 M

[56] References Cited
UNITED STATES PATENTS

| | | | |
|---|---|---|---|
| 2,082,277 | 6/1937 | Dierfeld | 188/366 |
| 3,260,331 | 7/1966 | Borman, Jr. | 188/170 X |
| 3,613,839 | 10/1971 | MacDuff | 188/170 |
| 3,630,093 | 12/1971 | Morse et al. | 188/170 X |
| 3,696,898 | 10/1972 | Sommer | 192/58 C X |
| 3,770,085 | 11/1973 | Cottingham | 188/170 X |

*Primary Examiner*—George E. A. Halvosa
*Attorney, Agent, or Firm*—Oldham & Oldham Co.

[57] ABSTRACT

The brake, including a brake housing, is characterized by a housing having an inwardly extending flange forming a pressure chamber with an annular piston slidably positioned in the brake housing, and the annular piston and a secondary piston are operatively associated with opposed sides of the inwardly extending flange to form pressure chambers therewith for individual actions in the brake. Spring means operatively engage the secondary piston for moving the same into operative pressure braking position for fail safe braking operation. Air pressure is supplied to the two pressure chambers or cylinders for controlling brake release and braking action.

2 Claims, 2 Drawing Figures

FIG. I 3,946,837

DISC BRAKE AND ACTUATOR ASSEMBLY

BACKGROUND OF INVENTION

Heretofore there have been many different kinds of fail safe brake mechanism provided and where the brakes have spring actuated parking or fail safe brake pressures set up therein. Typical prior art patents in this brake field include U.S. Pat. Nos. 3,638,773; 3,730,301 and 3,696,898.

In these prior braking structures, satisfactory results have been obtained in many instances. However, there is always a need for an improved, simplified braking assembly for pressure controlled braking actions and which will have fail safe characteristics but yet be provided by a mechanically uncomplicated, relatively inexpensive, sturdy braking structure.

The general object of the present invention is to provide a novel and improved fail safe type of a brake which is air actuated for normal braking action.

Another object of the invention is to provide an oilsheer brake unit wherein primary and secondary pressure cylinders and pistons are provided and wherein braking pressure is normally produced by the primary pressure piston and the secondary piston and cylinder control the brake fail safe braking action.

Another object of the invention is to position a primary pressure piston and a secondary pressure piston in operative association with each other for independent braking action by the primary piston and for relative movement of the primary and secondary pistons.

Another object of the invention is to provide a mechanically sound, relatively uncomplicated brake which will provide good brake action over a long service life.

The foregoing and other objects and advantages of the invention will be made more apparent as the specification proceeds.

Figure 2:
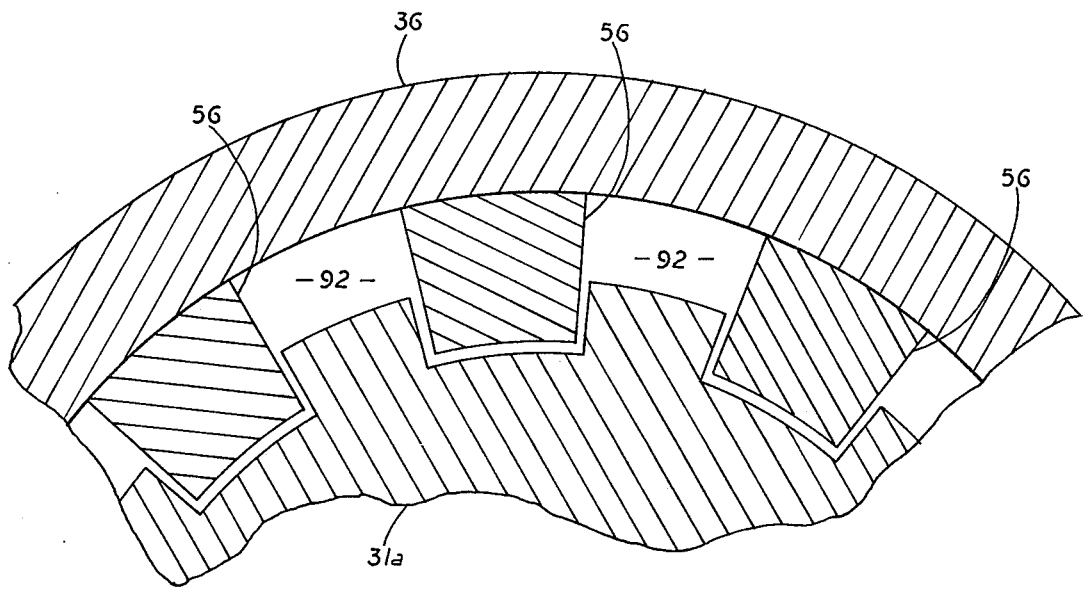

Reference now is made to the accompanying drawings, wherein:

FIG. 1 is a longitudinal vertical section through a brake embodying the principles of the invention; and FIG. 2 is a fragmentary section taken on line 2—2 of FIG. 1.

When referring to corresponding members shown in the drawings and referred to in the specification, corresponding numerals are used to facilitate comparison therebetween.

SUBJECT MATTER OF THE INVENTION

The wheel braking apparatus includes a brake housing and is characterized by the housing having a radially inwardly extending flange means thereon, an annular piston slidably positioned in the brake housing and forming a pressure cylinder with the housing and the annular flange, a tubular hub for the associated wheel extending into the brake housing and being concentric to a tubular portion thereof, a stack of brake discs alternately keyed to the brake housing and to the hub by spline means, a secondary piston carried by the annular piston for axial movement therewith and with relation thereto, which secondary piston forms a secondary pressure chamber with the inwardly extending housing flange and associated means, spring means positioned between the housing and the secondary piston to urge such piston axially into operative engagement with the pressure discs, air pressure supply means connecting to both pressure cylinders to advance the annular piston and apply braking action and to the secondary chamber to retract the secondary piston against the force of said spring means.

Regarding the details of the structure shown in the drawings, a brake of the invention is indicated as a whole by the numeral 10. This brake 10 is designed for use with an axle drive shaft 12 suitably journalled in a removable lead tube 14a carried by an axle housing 14b. The drive axle 12 is conventionally secured to a tubular hub 16 by an end plate 15. The hub 16 is journalled on the lead tube 14a as by bearings 18. This hub has a radially directed flange 20 protruding outwardly therefrom and to which a wheel 22 is secured by bolts 24 in a conventional manner.

A brake housing 30 is secured to the axle housing 14b as by bolts 32 extending through associated radially directed flanges formed on the brake housing and axle housing so that the brake housing is operatively positioned on and fixed to the axle housing immediately adjacent the wheel. The brake housing 30 includes an end wall 34, a tubular sleeve 36 and an end or back up wall 38. These end walls 34 and 38 are secured to the sleeve 36 as by cap screws 40 or the like. The sleeve 36 has an internal ring or sleeve 42 suitably secured thereto or formed therewith and such internal ring 42 has a radially inwardly extending flange 44 formed thereon intermediate its ends.

An annular piston 46 is slidably engaged with the flange 44 and such piston includes an axially extending sleeve section 48, a radially outwardly extending section 50 and an end pressure face or wall 52. A conventional O-ring seal 54 or other known means slidably seals the sleeve 48 to the radially inner end of the flange 44.

Two sets of brake discs 31a and 31b are operatively positioned within the brake housing 30 and alternate discs 31a are in splined engagement with axially extending lugs 56 secured to or formed on a radially inner portion of the sleeve 36. The discs 31b engage axially extending splines 58 formed on a radially outer portion of the tubular hub 16 for operatively positioning these brake discs between the stationary axle housing and the rotary hub to apply controlled braking action to the associated wheel.

Operative pressure is supplied to a pressure cylinder 60 formed between the primary annular piston 46 and the axle housing by an air pressure supply tube 62 connecting to a suitable fitting and passing pressure air through a bore 64 formed in the axle housing and connecting to such pressure cylinder 60. Normally the pressure supplied by the tube 62 is manually controlled, as by a brake pedal (not shown) actuating a hydraulic pressure or air low pressure brake system. A secondary pressure cylinder or chamber 66 is provided within the axle housing on the opposite axial face of the flange 44 and such second cylinder has a secondary annular piston 68 operatively positioned therein. Such piston is slidably supported on the sleeve 48 and sealed in relation thereto by a seal 70. It is in sealed engagement with an inner wall of the housing section or sleeve 48 by a seal 72. This secondary piston 68 has a radially inwardly extending shoulder or flange 74 formed thereon that can engage the end of the sleeve 48 of the piston 46 remote from the stack of brake discs 31a and 31b. Operative pressures are applied to the secondary piston 68 by springs 76 positioned in equally spaced circumferential relationship around the brake housing and operatively compressed between the secondary piston 68 and the end wall 34 of the housing. Thus, when no pressure is set up in the secondary cylinder 66, the springs 76 urge the secondary piston 68 to engage its flange 74 with the primary annular piston 46 and move it into compressive engagement with the stack of brake discs 31a and 31b for applying static, parking or dynamic emergency or "fail safe" braking pressures regardless of the pressure supplied to the chamber 60 of the brake. When it is desired to release the brake, pressure release fluid is supplied to the secondary cylinder 66 by a pressure supply tube 82 that connects to a suitable control source of pressure, normally air, for forcing the secondary piston 68 axially away from the brake disc stack and compressing the springs 76 to release the brake and permit controlled braking action through pressure supplied by the tube 62 to the chamber 60.

Preferably the braking action is obtained by an oil shear action set up within the stack of brake discs. Thus, a suitable oil supply tube 84 connects to the brake housing 30 and such tube may connect to or be a part of the pressure lubricant system of the vehicle or other supply system with which the brake means is associated for continuous supply of oil to the brake housing. Such oil flows into the brake housing under suitable pressure and it flows within a guide sleeve 86 that is suitably positioned in the brake housing 30. The oil will flow through circumferentially spaced axially extending bores 88 formed in the wheel hub 16 and then out through axially extending recesses 90 provided in the periphery of the hub 16 and connecting to the bores 88. Oil thus flows out, under the relatively low oil lubricant pressure provided in the engine, intermediate the stack of brake discs 31 whereby the brake discs need not be forced into full operative pressure engagement but which provide a braking action by an oil shear action through the films of oil between adjacent brake discs as compressed together. At the radially outer ends of the brake discs, oil will flow through axially extending openings 92 in the brake housing and through bores 94 formed in the sleeve 42. The oil then is discharged through a discharge 96 connecting to the brake housing and leading back to the lubricating system of the engine on the vehicle, or to the supply source used.

Axial adjustment of the springs 76 can be provided as by individual end caps engaging the springs and secured to the end wall 34. The springs would extend through holes in the end wall 34 and seat against the end caps.

Obviously, in use, if desired, braking action can be provided by combination of the forces set up by the springs 76 and by pressure provided in the chamber 60 from the tube 62 if no pressure is provided in the chamber 66 to remove the forces created by the springs 76 from the brake system.

The brake 10 can have any suitable anti-skid means associated therewith. Thus, a slotted ring 97 is secured to the hub 16 and extends inwardly therefrom immediately adjacent the end of a speed sensor device 98. Such device 98 is positioned on the axle housing 14b and transmits signals by wires 99 to a remote conventional brake control means for anti-skid action.

From the foregoing, it is believed that a novel and improved brake action has been obtained. Simplified but positive acting brake means is supplied by the present invention and the objects thereof are submitted to be achieved.

While one complete embodiment of the invention has been disclosed herein, it will be appreciated that modification of this particular embodiment of the invention may be resorted to without departing from the scope of the invention.

I claim:

1. In a wheel braking apparatus including a drive axle, an axle housing, a wheel journalled on said housing, and a brake housing characterized by an annular piston slidably positioned in said brake housing and forming a first pressure cylinder with said housing, said wheel having a tubular hub extending into said brake housing and being concentric to a tubular portion thereof, a stack of brake discs alternately keyed to said brake housing and to said hub by spline means, a second piston operatively carried by said annular piston for limited axial movement therewith and in relation thereto, said pistons having axially aligned portions and pressure chambers, said annular piston being positioned for operatively engaging an end of said stack of brake discs to apply compressive pressure thereto, said brake housing having an inwardly extending flange thereon positioned between axially aligned portions of said pistons and forming a wall of both of said pressure chambers, and said annular piston having an axially extending tubular section thereon extending away from said brake discs and being in sealed sliding engagement with said flange, said second piston being slidably mounted on said tubular section, said second piston having a radially inwardly extending shoulder for engaging the end of said tubular section of said annular piston to force it towards said brake discs when said second piston is moved in that direction, said annular piston being independently movable towards said brake discs, spring means positioned between said housing and said second piston to urge said second piston axially to move it and said annular piston into operative engagement with said brake discs, fluid pressure supply means connecting to said first pressure cylinder to advance said annular piston and compress said stack of discs, said housing, housing flange and said tubular section forming said second pressure cylinder, said second piston being positioned in said second pressure cylinder, and fluid pressure means connecting to said second pressure cylinder to move said second piston away from said brake discs against the force of said spring means whereby braking pressure can be provided solely from said first pressure cylinder.

2. In a wheel braking apparatus as in claim 1 where said annular and second pistons and said tubular section of said annular piston are of a size and are operatively correlated to said brake discs so that brake pressure can be applied by said spring means when no fluid pressure is supplied to said cylinders.

* * * * *